United States Patent
Jakubek et al.

(10) Patent No.: US 10,273,375 B2
(45) Date of Patent: *Apr. 30, 2019

(54) INK COMPOSITION

(71) Applicant: Hewlett-Packard Development Company, L.P., Houston, TX (US)

(72) Inventors: Vladimir Jakubek, Corvallis, OR (US); Richard J. McManus, Corvallis, OR (US); Sundar Vasudevan, Corvallis, OR (US); Matthew Thornberry, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 77 days.

This patent is subject to a terminal disclaimer.

(21) Appl. No.: 15/311,170

(22) PCT Filed: Jun. 6, 2014

(86) PCT No.: PCT/US2014/041365
§ 371 (c)(1),
(2) Date: Nov. 14, 2016

(87) PCT Pub. No.: WO2015/187179
PCT Pub. Date: Dec. 10, 2015

(65) Prior Publication Data
US 2017/0088735 A1    Mar. 30, 2017

(51) Int. Cl.
*C09D 11/40* (2014.01)
*C09D 11/38* (2014.01)
(Continued)

(52) U.S. Cl.
CPC .............. *C09D 11/38* (2013.01); *B41J 2/175* (2013.01); *C09D 11/102* (2013.01); *C09D 11/324* (2013.01); *C09D 11/36* (2013.01)

(58) Field of Classification Search
None
See application file for complete search history.

(56) References Cited

U.S. PATENT DOCUMENTS

| 4,129,587 A | 12/1978 | Jennings et al. |
| 4,405,329 A | 9/1983 | Abel et al. |
| (Continued) | | |

FOREIGN PATENT DOCUMENTS

| JP | 2097576 | 4/1990 |
| TW | 201249937 | 12/2012 |
| (Continued) | | |

OTHER PUBLICATIONS

International Search Report and Written Opinion for International Application No. PCT/US2014/041365 dated Feb. 16, 2015, 9 pages.

*Primary Examiner* — Erica S Lin
(74) *Attorney, Agent, or Firm* — Dierker & Kavanaugh PC (57) ABSTRACT

An ink composition includes colorant, co-solvent system, acid (e.g., oleic, linoleic, undecanoic, dodecanoic, and/or tridecanoic acids), lithium, polymer as binder, and water. The co-solvent system is selected from i) from ~9 to ~25 wt % of sulfolane with no other co-solvent, ii) hydroxylated co-solvent, from ~4 to ~16 wt % of sulfolane, and at least 8 wt % of another non-hy-droxylated co-solvent; iii) hydroxylated co-solvent, from ~7 to ~16 wt % of sulfolane, and at least 3 wt % of the other non-hydroxylated co-solvent; and iv) a hydroxylated co-solvent and from ~9 wt % to ~16 wt % of sulfolane. When i) or ii) or iv) is used, at least 0.15 wt % acid and at least 200 ppm lithium are included; or when iii) is used, at least 0.25 wt % acid and at least 100 ppm lithium are included; or when iii) is used, at least 0.15 wt % acid and at least 150 ppm lithium are included.

16 Claims, 3 Drawing Sheets

(51) Int. Cl.
  *C09D 11/102* (2014.01)
  *C09D 11/324* (2014.01)
  *B41J 2/175* (2006.01)
  *C09D 11/36* (2014.01)

(56) References Cited

U.S. PATENT DOCUMENTS

| | | | |
|---|---|---|---|
| 5,160,372 A | 11/1992 | Matrick | |
| 5,258,064 A | 11/1993 | Colt | |
| 5,472,490 A | 12/1995 | Sawamura et al. | |
| 5,492,653 A | 2/1996 | Hochheinier et al. | |
| 5,539,038 A | 7/1996 | Katsen et al. | |
| 5,658,499 A | 8/1997 | Steinberg et al. | |
| 5,734,403 A | 3/1998 | Suga et al. | |
| 5,980,623 A | 11/1999 | Hiraoka et al. | |
| 6,124,376 A | 9/2000 | Nichols et al. | |
| 6,383,275 B1 | 5/2002 | Lin | |
| 6,544,591 B2 | 4/2003 | Slone | |
| 7,695,555 B2 | 4/2010 | Kabalnov et al. | |
| 7,705,069 B2 | 4/2010 | Reinhardt et al. | |
| 7,901,499 B2 | 3/2011 | Kitamura et al. | |
| 8,003,714 B2 | 8/2011 | Yamashita | |
| 8,029,612 B2 | 10/2011 | Ishii et al. | |
| 8,636,351 B2 | 1/2014 | Hasegawa et al. | |
| 9,193,884 B2 * | 11/2015 | Vasudevan | B41J 2/165 |
| 9,410,010 B2 | 8/2016 | Roberts et al. | |
| 9,738,804 B2 * | 8/2017 | McManus | C09D 11/36 |
| 2003/0060537 A1 | 3/2003 | Palazzo | |
| 2004/0110865 A1 | 6/2004 | McCovick et al. | |
| 2005/0004263 A1 | 1/2005 | Gould et al. | |
| 2007/0040880 A1 | 2/2007 | Jackson et al. | |
| 2007/0076068 A1 | 4/2007 | Guo et al. | |
| 2007/0091156 A1 | 4/2007 | Jackson | |
| 2008/0178766 A1 | 7/2008 | McGorrin | |
| 2009/0031922 A1 | 2/2009 | Rengaswamy et al. | |
| 2009/0047484 A1 * | 2/2009 | Kitamura | C09D 11/38 428/195.1 |
| 2010/0075052 A1 | 3/2010 | Irita | |
| 2010/0081740 A1 | 4/2010 | Jackson | |
| 2011/0012954 A1 | 1/2011 | Brown et al. | |
| 2011/0234695 A1 | 9/2011 | Yamazaki et al. | |
| 2011/0236649 A1 | 9/2011 | Nishiki et al. | |
| 2012/0156375 A1 | 6/2012 | Brust et al. | |
| 2012/0162307 A1 | 6/2012 | Yamazaki | |
| 2013/0057625 A1 | 3/2013 | Yamazaki | |
| 2013/0108952 A1 | 5/2013 | Nakano et al. | |
| 2013/0237661 A1 | 9/2013 | Brust et al. | |
| 2013/0253130 A1 | 9/2013 | Berge | |
| 2013/0267656 A1 | 10/2013 | Berge | |
| 2013/0321521 A1 | 12/2013 | Fujie et al. | |
| 2014/0017461 A1 | 1/2014 | Matsuyama | |
| 2014/0071196 A1 | 3/2014 | Hihara et al. | |

FOREIGN PATENT DOCUMENTS

| | | |
|---|---|---|
| WO | WO-96/10603 | 4/1996 |
| WO | WO-2004/080723 | 9/2004 |
| WO | WO-2009034394 | 3/2009 |
| WO | WO-2011/115614 | 9/2011 |
| WO | WO-2013/095497 | 6/2013 |
| WO | WO-2013/192268 | 12/2013 |

* cited by examiner

302 — Selecting an Ink Composition for High Speed Printing, the Ink Composition Including a Colorant; a Co-Solvent System Selected from the Group Consisting of i) from about 9 wt% to about 25 wt% of Sulfolane with No Other Co-Solvent ii) a Hydroxylated Co-Solvent, from about 4 wt% to about 16 wt% of Sulfolane, and at least 8 wt% of Another Non-Hydroxylated Co-Solvent; iii) a Hydroxylated Co-Solvent, from about 7 wt% to about 16 wt% of Sulfolane, and at least 3 wt% of the other Non-Hydroxylated Co-Solvent; and iv) a Hydroxylated Co-Solvent and from about 9 wt% to about 16 wt% of Sulfolane; an Acid Selected from the Group Consisting of Oleic Acid, Linoleic Acid, Undecanoic Acid, Dodecanoic Acid, Tridecanoic Acid, and Combinations thereof; Lithium; a Polymer Binder; and Water; wherein any of: When the Co-Solvent System is i), ii), or iv), at least 0.15 wt% of the Acid and at least 200 ppm of the Lithium are Included; or when the Co-Solvent System is iii) at least 0.25 wt% of the Acid and at least 100 ppm of the Lithium are Included; or when the Co-Solvent System is iii) at least 0.15 wt% of the Acid and at least 150 ppm of the Lithium are Included 304 — Printing the Ink Composition Using a Printer having a Drop Frequency Ranging from about 24 kHz to about 36 kHz, wherein a Thick Thin Line Print Image Quality Defect is Reduced in a Resulting Image Fig-4A  Fig-4B  Fig-4C

INK COMPOSITION

BACKGROUND

Inkjet printing or recording systems are commonly used as an effective way to produce images on a print medium, such as paper. Generally, ink droplets are ejected from a nozzle by the inkjet printing system and onto the print medium to produce an image thereon. Examples of inkjet printing systems include thermal inkjet printers and piezoelectric inkjet printers.

BRIEF DESCRIPTION OF THE DRAWINGS

Features and advantages of examples of the present disclosure will become apparent by reference to the following detailed description and drawings, in which like reference numerals correspond to similar, though perhaps not identical, components.

DETAILED DESCRIPTION

Examples of the ink composition disclosed herein form images that exhibit desirable print quality when the ink composition is printed using any inkjet printing system (e.g., thermal, piezoelectric), including a high speed inkjet printing system. As used herein, a high speed inkjet printing system refers to any inkjet printer having a drop frequency ranging from about 24 kHz to about 36 kHz. The ink composition may also be printed with any inkjet printing system having a drop frequency ranging from about 2 kHz to about 36 kHz.

With regard to print quality, the ink composition disclosed herein reduces or eliminates at least thick thin line (TTL) print image quality defects in the printed image. The term "thick thin line print image quality defect(s)" or "TTL print image quality defect(s)" refers to a printed image wherein a uniform nozzle print pattern appears non-uniform due to the presence of a previously printed non-uniform nozzle print pattern. In an example, along the swath height of a printhead, when there is non-uniform nozzle usage, it forms a non-uniform print pattern (e.g., the spaced lines of text shown in FIG. 1); and along the swath direction of printing (after the non-uniform nozzle print pattern is formed), when there is uniform nozzle usage, it forms another print pattern, such as a line, that spans the length of the swath height. The TTL print image quality defect may be exhibited when the uniform nozzle usage print pattern appears non-uniform due to the presence of the previously printed non-uniform nozzle print pattern (as shown in the exploded portion of FIG. 1).

Figure 1:
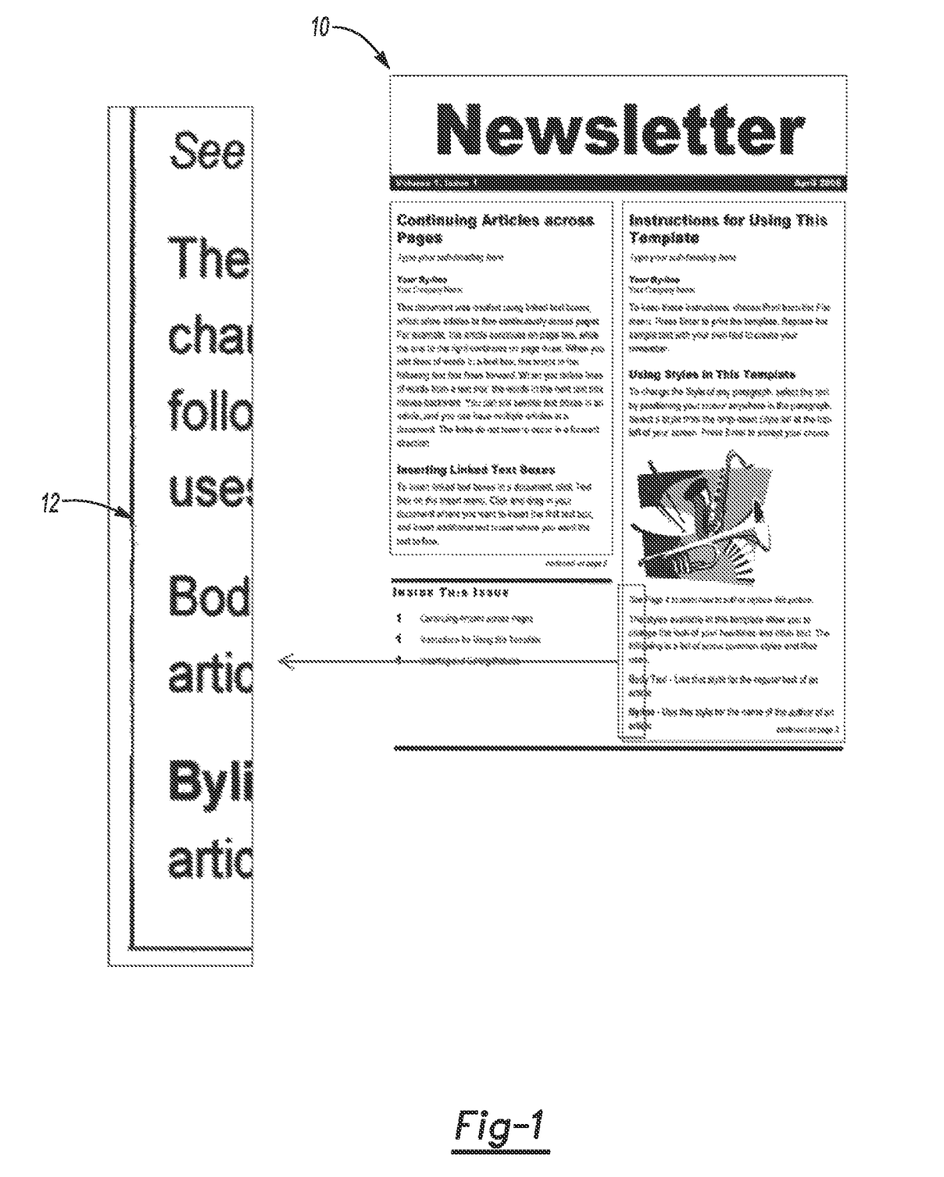
FIG. 1 illustrates an example printed image and an exploded portion of the printed image having a thick thin line print image quality defect.

An example of the TTL print image quality defect is shown in FIG. 1. In FIG. 1, the printed image 10 is a newsletter. The exploded portion of the image 10 includes several (e.g., 9) lines/rows of text and a vertical line 12 printed just to the left of the beginning of each line/row. The swath direction is left to right in the top half of the exploded portion and right to left in the bottom half of the exploded portion. As depicted in the exploded portion, the vertical line 12 is thicker adjacent to the first 5 lines/rows of text and then is thinner adjacent to the $6^{th}$ and $7^{th}$ lines/rows of text, and then again is thicker adjacent to the last few lines/rows of text. The vertical line 12 has a varying width along the length/height (e.g., from top to bottom) along the medium, and thus exhibits the TTL print image quality defect.

In addition to improving print quality, the example ink composition(s) also improve decap performance. The term "decap performance," as referred to herein, means the ability of the ink composition to readily eject from the printhead, upon prolonged exposure to air. The decap time is measured as the amount of time that a printhead may be left uncapped before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. The longest decap time that would give acceptable first drop quality or the fewest number of spits required at any given decap time would be desirable for any given ink.

Generally, as water evaporates from an ink formulation, the percentage of organic components in the ink increases. As the ink becomes more enriched in the organic co-solvents and other nonvolatile components, a colorant (e.g., a dispersed pigment) therein which is strongly hydrophilic is pulled back/retracted into the bulk of the aqueous phase.

Examples of the present disclosure control the degree/rate of pigment retraction in an efficient and cost-effective manner. Pigment retraction is referred to herein as "pigment ink vehicle separation" (PIVS).

As pigmented ink dries in an inkjet printhead, a rapid PIVS may take place (e.g., within about 1-4 seconds), which may result in the nozzles and/or the ink channel being substantially devoid of the colorant. As such, a rapid rate of PIVS is generally undesirable because of the idle (or decap) time being too short. To address PIVS, inkjet printers may force the printhead to spit onto a special absorbing pad/spittoon on a regular basis after a period of idle time (e.g., a predetermined number of spits per nozzle at a given frequency may maintain nozzle health of idle nozzles during printing). The rate of spitting is substantially controlled by the rate of PIVS. Very frequent spits are generally undesirable, because ink is consumed during spitting, and printing is slowed down.

In contrast, a slow rate of PIVS (e.g., from about greater than 4 seconds to about 60 seconds) is generally beneficial for the printhead functioning, for example, when the printhead is stored in an uncapped position, because it prevents the undesirable clogging of the nozzles or retraction of the colorant from the nozzle. Further, in some instances, it may be desirable for a print system to exhibit very slow PIVS (e.g., from greater than a minute to several hours).

Further, examples of the ink composition according to the present disclosure also provide improved decap performance for dye-based inks. In the case of both pigment-based and dye-based previously known inks, as water evaporates, a viscous plug may form at the nozzle in some instances. A subsequent ink drop would have to be fired through this viscous plug, and as such, the first few drops may not be ejected/ejected appropriately out of the orifice. Depending on the ink, successful ejection may occur after a couple of firing events. In contrast, examples of the ink composition of the present disclosure appear to prevent formation of this viscous plug (in pigment-based or dye-based inks), as well as controlling PIVS (in pigment-based inks).

Examples of the ink composition disclosed herein include components that provide excellent print quality and decap performance. In particular, the ink composition disclosed herein includes a specific co-solvent system, and specific amounts of acid and/or lithium.

Each example of the co-solvent system includes the non-hydroxylated co-solvent sulfolane (i.e., tetramethylene sulfone). The presence of sulfolane, either alone or in combination with another non-hydroxylated co-solvent, contributes to the reduction or elimination of the TTL print image quality defect in images formed with the ink composition. In some examples, the sulfolane is present with no other co-solvent (i.e., no other hydroxylated or non-hydroxylated solvent is present in the ink composition). In these examples, the sulfolane may be present in an amount ranging from about 9 wt % to about 25 wt % of the total wt % of the ink composition.

In some other examples, the sulfolane is present with no other non-hydroxylated co-solvent (i.e., sulfolane is the only non-hydroxylated solvent present in the ink composition), but a hydroxylated co-solvent may also be present. In these examples, the sulfolane may be present in an amount ranging from about 9 wt % to about 16 wt % of the total wt % of the ink composition.

In still other examples, the sulfolane is present with the hydroxylated co-solvent and with another non-hydroxylated co-solvent. Examples of other non-hydroxylated co-solvents that may be used include 2-pyrrolidinone, diethyleneglycol dimethyl ether, and combinations thereof. In one example when sulfolane is used in combination with the hydroxylated co-solvent and the other non-hydroxylated co-solvent, the sulfolane may be present in an amount ranging from about 4 wt % to about 16 wt % of the total wt % of the ink composition, while the other non-hydroxylated co-solvent may be present in an amount of at least 8 wt % of the total wt % of the ink composition. In another example when sulfolane is used in combination with the hydroxylated co-solvent and the other non-hydroxylated co-solvent, the sulfolane may be present in an amount ranging from about 7 wt % to about 16 wt % of the total wt % of the ink composition while the other non-hydroxylated co-solvent may be present in an amount of at least 3 wt % of the total wt % of the ink composition.

As mentioned above, some examples of the co-solvent system may also include a hydroxylated co-solvent. Examples of the hydroxylated co-solvent include 2-methyl-1,3-propanediol, 2-hydroxyethyl-2-pyrrolidinone, 2-ethyl-2-hydroxymethyl-1,3-propanediol (EHPD) (also known as trimethylolpropane), di-(2-hydroxyethyl)-5,5-dimethylhydantoin (commercially available as DANTOCOL® DHE from Lonza, Inc., Allendale, N.J.), glycerol, diethylene glycol, triethylene glycol, tripropylene glycol, tetraethylene glycol, dipropyleneglycol, 3-methyl-1,3-butanediol, 3-methyl-1,5-pentanediol, 1-(2-hydroxyethyl)-2-imidazolidinone, 1,6-hexanediol, 1,5-pentanediol, and combinations thereof. When included, the hydroxylated co-solvent may be present in an amount ranging from about 9 wt % to about 14.5 wt % of the total wt % of the ink composition.

As mentioned above, examples of the ink composition also include lithium, and an acid (e.g., a fatty acid surfactant) chosen from oleic acid (i.e., cis-octadec-9-enoic acid having one cis double bond), linoleic acid (two cis double bonds), undecanoic acid, dodecanoic acid, tridecanoic acid, and combinations thereof.

The fatty acid surfactant has a carboxylate head and a long alkyl tail (e.g., saturated fatty acids having from 11 to 13 carbon atoms including the carboxylate head or unsaturated fatty acids having a chain length of 18 carbon atoms). It appears that the carboxylate group aids in contributing to good decap. In addition, the alkyl tail has one or two cis double bonds. It has been discovered that the corresponding fully saturated fatty acids with 14 carbons or more, or those with trans double bonds generally do not provide the same benefit for enhancing decap performance. As such, examples of the ink composition of the present disclosure exclude acids chosen from stearic acid (a fully saturated fatty acid with 18 carbons), elaidic acid (the trans isomer of oleic acid), linolenic acid (three cis double bonds), linear (as opposed to branched) saturated fatty acids having a carbon chain of fewer than 11 carbons, and linear saturated fatty acids having a carbon chain of more than 13 carbons, and combinations thereof.

In an example, the chosen acid is dodecanoic acid (also known as lauric acid).

It is to be understood that the lithium may be present in the composition as an ion in solution, or as a lithium salt of the acid. As an example, the lithium may be added to the ink composition in the form of a number of its salts, for example, lithium chloride, lithium bromide, lithium iodide, lithium hydroxide, lithium acetate, lithium benzoate, lithium nitrate, or combinations thereof. However, lithium carbonate is generally not desirable; as it appears to degrade decap performance in some instances.

Further, other alkali metals, e.g., sodium and/or potassium, may be present in examples of the ink composition. However, it is to be understood that the lithium aids in forming an anti-evaporative layer; whereas other alkali metals that may be present do not function to aid in formation of the anti-evaporative layer, nor do they hinder formation of the anti-evaporative layer.

The amount of acid and/or lithium included in the ink composition disclosed herein may depend, in part, upon the non-hydroxylated co-solvent(s) included in the co-solvent system. The amount of acid that is included may also depend upon the amount of lithium that is included, and vice versa. Table 1 provides examples of acid and lithium amounts that may be used in combination with the various co-solvent systems.

TABLE 1

| Co-solvent System | Sulfolane wt % range | Other non-hydroxylated co-solvent wt % | Acid (wt %) | Lithium (ppm) |
|---|---|---|---|---|
| Sulfolane alone | 9-25 | None | ≥0.15 | ≥200 |
| Sulfolane and hydroxylated co-solvent | 9-16 | None | ≥0.15 | ≥200 |
| Hydroxylated co-solvent, Sulfolane, and another non-hydroxylated co-solvent | 4-16 | ≥8 | ≥0.15 | ≥200 |
| Hydroxylated co-solvent, Sulfolane, and another non-hydroxylated co-solvent | 7-16 | ≥3 | ≥0.25 | ≥100 |
| Hydroxylated co-solvent, Sulfolane, and another non-hydroxylated co-solvent | 7-16 | ≥3 | ≥0.15 | ≥150 |

Table 2 provides some specific examples of the co-solvent systems (types of co-solvents and amounts) as well as suitable example amounts of acid and lithium for these co-solvent systems.

TABLE 2

| Co-solvent System | Hydroxylated co-solvent wt % | Sulfolane wt % | Other non-hydroxylated co-solvent wt % | Acid (wt %) | Lithium (ppm) |
|---|---|---|---|---|---|
| 2-hydroxyethyl-2-pyrrolidinone* and sulfolane | about 13.2 | about 10.5 | None | about 0.18 | about 212 |
| 2-hydroxyethyl-2-pyrrolidinone*, sulfolane and 2-pyrrolidinone | about 13.2 | about 4.0 | about 8.8 | about 0.18 | about 212 |
| 2-hydroxyethyl-2-pyrrolidinone*, sulfolane and 2-pyrrolidinone | about 13.2 | about 7.0 | about 3.5 | ≥0.25 (e.g., ranging from about 0.26 to about 0.34) | about 100 |
| 2-hydroxyethyl-2-pyrrolidinone*, sulfolane and 2-pyrrolidinone | about 13.2 | about 7.0 | about 3.5 | about 0.18 | ≥150 (e.g., ranging from about 150 to about 212) |

*hydroxylated co-solvent

In any of the examples disclosed herein, an example upper limit of the amount of acid that may be included is about 1.0 wt %, and an example upper limit of the amount of lithium that may be included is 400 ppm.

In addition to the co-solvent system, the acid, and the lithium, the examples of the ink composition disclosed herein also include a colorant, a polymer binder, and a balance of water. Other additives, such as a biocide or a non-ionic surfactant may also be added to the ink composition.

The colorant may be any of self-dispersed pigments, polymer dispersed pigments, dyes, and combinations thereof.

Carbon blacks may be used as the colorant in examples of the present ink composition. For example, carbon blacks may be used that are of the lamp black, furnace black or gas black type. These carbon blacks may be made water dispersive: through oxidation, either through the carbon black process or through post carbon black manufacturing treatment (e.g., by ozonation); by reaction of the carbon black surface with either small molecule, oligomeric or polymeric materials that are water soluble or dispersive in nature (e.g., p-aminobenzoic acid, acrylic based oligomers or polymers made of monomers such as acrylic or methacrylic acid and esters thereof, and/or polyurethane oligomers or polymers). These carbon blacks may also be made dispersive in water through adsorption of oligomers or polymers of the previously mentioned acrylic, methacrylic, or polyurethane compositions. Carbon blacks can be further made dispersive through encapsulation of the pigment with a latex polymer composed of, e.g., acrylic acid, acrylic esters, methacrylic acid, methacrylic esters, styrene or vinyl acetate. These materials can be made dispersive through the inclusion of various functional groups (such as carboxylates, sulfonates, phosphates or ethylene oxide derivatives) within the polymer.

Some suitable self-dispersed carbon blacks, as well as polymer dispersed pigments are commercially available from E.I. du Pont de Nemours and Co. (Wilmington, Del.), Sensient Technologies Corporation (Milwaukee, Wis.), and Cabot Corporation (Boston, Mass.).

Other pigments with no limitation on color or chemical composition can be used, some examples of which include PY74, PY155, PY128, PY185, PR122, PR254, PR178, PV19, PB15:2, PB15:3, and PB15:4. These colorants can also be made dispersive in water by various means such as small molecule, oligomeric or polymeric attachment, through adsorption of oligomeric or polymeric materials, or through encapsulation (e.g., as described for carbon black).

Any suitable dyes may be used in examples of the present ink composition.

In the examples disclosed herein, the colorant is present in an amount ranging from about 2 wt % to about 6.5 wt % of the total wt % of the ink composition. In another example, the colorant is present in an amount ranging from about 4 wt % to about 4.5 wt % of the total wt % of the ink composition.

It is to be understood that the colorant, along with the polymer binder, may render the ink composition with a high solids content (i.e., total amount of colorant and binder together). In an example, the colorant loading and the polymer binder loading are selected so that the total (high) solids content of the ink composition ranges from about 4.5 wt % to about 9.0 wt % of the total weight percent of the ink composition. Examples of the polymer binder amount are described below.

The polymer binder may be a polyurethane copolymer binder or an acrylate type polymer binder. When included, the amount of the polymer binder in the ink composition may range from about 1 wt % to about 3 wt % of the total wt % of the ink composition. In another example, the amount of the polymer binder ranges from about 1.7 wt % to about 2.0 wt %. As mentioned above, the colorant loading and the polymer binder loading may be selected so that the total (high) solids content of the ink composition ranges from about 4.5 wt % to about 9.0 wt % of the total weight percent of the ink composition. When a high solids content is used, the resulting printed images may exhibit a desirable optical density and a desirable durability.

In an example, the binder used in the ink composition disclosed herein is a polyurethane copolymer binder formed from the polymerization of a diisocyanate and at least three diols. In an example, the at least three diols include a first diol containing a hydrophilic stabilizing group, and one or more of a second diol having less than 8 atoms in a backbone chain between two hydroxyl groups (which leads to the formation of a short hard segment (shown in formula (IV) below)). In another example, the at least three diols include the first diol, the second diol, and a third diol having a formula OH—R—OH, wherein R is selected from the group consisting of a polyether, a polyester, a polycarbonate, a polycarbonate-co-polyester, and an acrylic. In yet another example, the at least three diols include the first diol, the second diol, and a third diol having a formula OH—$R^4$—OH, where "$R^4$" is defined in formula IV below. As examples, $R^4$ may be a $C_1$-$C_7$ alkyl, or a $C_6$-$C_{40}$ aryl, or a $C_9$-$C_{40}$ aryl substituted by $C_1$-$C_{10}$ alkyl. Examples of each of the diols are provided below.

In the examples disclosed herein, the polyurethane copolymer binder is formed from the reaction of isocyanate and diols, and thus includes hard and soft segments. The hard segment is the segment in between and including two adjacent carbamate groups. The soft segment is formed from high molecular weight diols or polyols. A soft segment is mobile and may be present in a coiled formation. The urethane groups on one polymer chain form hydrogen bonds with the same or similar groups on neighboring polymer chains, resulting in a polyurethane network. In many instances, a soft continuous phase surrounds a hard semi-crystalline region in a polyurethane network.

In the polyurethane, the hard segment is covalently coupled to a soft segment. Adjusting the hard and soft segments can provide the polyurethane copolymer with a desired level of elasticity and toughness. In many polyurethanes, ionizable groups are incorporated into the hard segment to render the polyurethane water dispersible. However, ionizable groups can interfere with the inter-molecular hydrogen bonding, and thus in the examples disclosed herein, ionizable groups are not included in at least the short hard segments (e.g., see formula (IV) below) of the resulting polyurethane copolymer. This strengthens the polyurethane copolymer. Separation of ionizable groups from the short hard segment can also lead to better control of the acid content while reducing the time for semi-crystalline region formation, which in turn reduces the dry-time.

In the examples disclosed herein, the ratio of the isocyanate to diol is greater than 1:1. In an example, the ratio of isocyanate to diol ranges from about 1.05:1 to about 1.5:1.

In an example, the polyurethane copolymer binder has the following structure:

(I)

wherein each of $Q^1$, $Q^2$, and $Q^3$ is independently selected from (II)

(III)

and (IV)

as long as $Q^1$, $Q^2$, and $Q^3$ contain at least one of (II), at least one of (III), and at least one of (IV). In (II), (III), and/or (IV), the following are applicable:

each $R^1$ is $C_1$-$C_{20}$ alkyl, $C_3$-$C_{20}$ substituted alkyl, $C_3$-$C_{10}$ cycloalkyl, $C_3$-$C_{20}$ substituted cycloalkyl, or $C_6$-$C_{40}$ aryl or $C_9$-$C_{40}$ substituted aryl from a diisocyanate;

each $R^2$ is independently $C_3$-$C_{20}$ substituted alkyl, $C_3$-$C_{20}$ substituted cycloalkyl, or $C_9$-$C_{40}$ substituted aryl;

each $R^3$ is independently $C_9$-$C_{20}$ alkyl, $C_9$-$C_{20}$ alkyl substituted by $C_1$-$C_{10}$ alkyl or $C_6$-$C_{15}$ aryl, $C_9$-$C_{40}$ aryl or $C_9$-$C_{40}$ aryl substituted by $C_1$-$C_{10}$ alkyl or $C_6$-$C_{20}$ aryl, or —($R^{11}$—O—$R^{10}$—O—$R^{11}$)—; HO—$R^3$—OH is a diol incorporating polyether, polyester, polycarbonate, polycarbonate-co-polyester, or acrylic;

each $R^4$ is independently $C_1$-$C_7$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{10}$ alkyl or $C_6$-$C_{20}$ aryl, provided that the backbone atoms on $R^4$ forming a chain linking the two oxygen atoms in (IV) are less than 8;

n, m and p are integers from 1 to 200;

the capping agent is one or more members selected from the group consisting of $R^5CHR^6OH$, $R^5CHR^6SH$, $R^6R^7NH$, H—$(OR^8)_q$—OH, and epoxide $CH_2OCR^6R^7$;

each $R^5$ is H, $C_1$-$C_{20}$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{40}$ alkyl or $C_6$-$C_{20}$ aryl;

each $R^6$ is H, $C_1$-$C_{20}$ alkyl, $C_6$-$C_{40}$ aryl or —$R^9OR^8$;

each $R^7$ is H, —$R^9OR^8$, $C_1$-$C_{20}$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{10}$ alkyl or $C_6$-$C_{20}$ aryl, provided that when $R^6$ is H, $R^7$ is not H;

$R^6$ and $R^7$ can be taken together with the nitrogen atom to form a cyclic amine or substituted cyclic amine with an O or S atom replacing a C atom on said cyclic amine;

each $R^8$ is $C_1$-$C_{20}$ alkyl or $C_6$-$C_{20}$ aryl;

each $R^9$ is $C_1$-$C_{20}$ alkyl, $C_3$-$C_{20}$ alkyl substituted by $C_1$-$C_{10}$ alkyl or $C_6$-$C_{15}$ aryl;

each $R^{10}$ is independently $C_4$-$C_{20}$ alkyl, $C_4$-$C_{20}$ alkyl substituted by $C_1$-$C_{10}$ alkyl or $C_6$-$C_{15}$ aryl, $C_9$-$C_{40}$ aryl or $C_9$-$C_{40}$ aryl substituted by $C_1$-$C_{10}$ alkyl or $0_6$-$0_{20}$ aryl;

each $R^{11}$ is independently $C_1$-$C_{20}$ alkyl, $C_4$-$C_{20}$ alkyl substituted by $C_1$-$C_{10}$ alkyl or $C_6$-$C_{15}$ aryl; and q is an integer from 1 to 20.

In the examples disclosed herein, the isocyanate is a diisocyanate. Suitable diisocyanates may be selected from the group consisting of 1,6-hexamethylene diisocyanate (HDI), isophorone diisocyanate (IPDI), trimethylhexamethylene diisocyanate (TMDI), 2,4-toluene diisocyanate (2,4-TDI), 2,6-toluene diisocyanate (2,6-TDI), 4,4'-diphenylmethane diisocyanate (MDI), 4,4-dicyclohexylmethane diisocyanate ($H_{12}$MDI), 3,3'-dimethyl-4,4'-biphenyl diisocyanate (TODI), dodecane diisocyanate ($C_{12}$DI), 1,5-naphthalene diisocyanate (NDI), m-tetramethylene xylylene diisocyanate (TMXDI), 1,4-benzene diisocyanate, trans-cyclohexane-1,4-diisocyanate, and 4,6-xylyene diisocyanate.

Some examples of the first diol, which includes a hydrophilic stabilizing group and ultimately forms part of the monomer with Formula (II), include dimethylol acetic acid, 2,2'-dimethylol butanoic acid, 2,2'-dimethylol propionic acid (DMPA), and 2,2'-dimethylol butyric acid.

Some examples of the second diol, which has less than 8 atoms in the backbone chain between two hydroxyl group and ultimately forms part of the monomer with Formula (IV), include 1,2-propanediol, 1,3-propanediol, ethylene glycol, 1,4-butanediol, 1,5-pentanediol, 1,6-hexanediol, 1,2-hexanediol, neopentyl glycol, 2-methyl-1,3-propanediol, 3-methyl-1,5-pentane diol, and combinations thereof.

When included, examples of the third diol have a hydrophobic segment and ultimately form part of the monomer with Formula (III). Some examples of this third diol have the formula OH—R—OH, wherein R is selected from the group consisting of a polyether, a polyester, a polycarbonate, a polycarbonate-co-polyester, and an acrylic. Other examples of the third diol have the formula OH—$R^4$—OH. $R^4$ may be any of the examples previously given, such as a $C_1$-$C_7$ alkyl, or a $C_6$-$C_{40}$ aryl, or a $C_9$-$C_{40}$ aryl substituted by $C_1$-$C_{10}$ alkyl.

Any suitable method that reacts the isocyanate with the at least three diols may be used to form the polyurethane copolymer. The previously mentioned capping agent may be added when it is desirable to terminate the polymerization. The amount of the capping agent employed should be approximately equivalent to the unreacted isocyanate groups in the prepolymer. The ratio of active hydrogens from amine groups in the chain terminator to isocyanate groups in the prepolymer are in the range from about 1.0:1 to about 1.2:1, or from about 1.0:1.1 to about 1.1:1, or from about 1.0:1.05 to about 1.1:1, on an equivalent basis.

In the final polyurethane copolymer binder, the mole percentage of the second diol is at least 30% of a total mole percentage of diol monomers in the polyurethane copolymer binder. The acid number of the polyurethane copolymer binder ranges from 50 to 70, and the number average ($M_n$) molecular weight of the polyurethane copolymer binder ranges from about 3,500 to about 10,000. In another example, the $M_n$ of the polyurethane copolymer binder ranges from about 5,000 to about 8,500.

As mentioned above, the polymer binder may be an acrylate type polymer. Suitable acrylate polymers can consist of polymers having a molecular weight ranging from about 2000 to about 200,000, an acid number of from about 30 to about 180. Some examples of suitable monomers include acrylic acid, methacrylic acid, and esters of both acrylic acid and methacrylic acid.

Examples of the ink composition of the present disclosure may further include an additive chosen from non-ionic surfactants, biocides, and combinations thereof.

When a non-ionic surfactant is utilized, a suitable amount of the non-ionic surfactant may range from about 0.05 wt % to about 2 wt %. Some specific examples of the non-ionic surfactant that may be used in the ink composition disclosed herein include acetylene diols, bis-tartrate esters, 1,2-hexanediol, mono alcohols, N-alkylpyrrolidinones, and combinations thereof. One example of the acetylene diol is SURFYNOL® 104, available from Air Products and Chemicals, Inc., Allentown, Pa. Examples of suitable bis-tartrate esters include diisoamyl tartrate, dibutyl tartrate, dibenzyl tartrate, and diisopropyl tartrate. Some examples of suitable mono alcohols include lauryl alcohol (i.e., 1-dodecanol), oleyl alcohol (i.e., octadec-9-en-1-ol), stearyl alcohol (i.e., 1-octadecanol), and combinations thereof. Examples of the N-alkylpyrrolidinone are N-octylpyrrolidinone and N-dodecylpyrrolidinone. Some commercially available N-alkylpyrrolidinones include SURFADONE® LP-100 (octylpyrrolidinone) and SURFADONE® LP-300 (dodecylpyrrolidinone), both of which are available from Ashland Inc. In one example, the non-ionic surfactant is selected so that it does not include any ethyleneoxy groups.

When a biocide is utilized, a suitable amount of the biocide may range from about 0.05 wt % to about 0.5 wt %. It is to be understood that the upper limit for the biocide(s) may depend upon the type of biocide and its toxicological effect and/or regulatory requirements. Suitable biocides include, for example, PROXEL™ GXL, KORDEK™ MLX (The Dow Chemical Co.), BIOBAN™ CS-1246 (The Dow Chemical Co.), and/or ACTICIDE® B20 and/or M20 (Thor GmbH).

In any of the examples disclosed herein, a balance (up to 100 wt %) of the composition is water.

The viscosity of the ink composition ranges from about 1.5 mPa·s to about 5.0 mPa·s.

The pH of examples of the ink composition generally ranges from about 7 to about 11. It may be desirable that the ink composition have a basic pH, ranging anywhere from greater than 7 to 12. When the initial pH of the resulting ink composition is acidic, neutral, or near-neutral basic (e.g., having a pH ranging from 7.1 to 8), it may be desirable to adjust the pH of the resulting ink composition to a basic or more basic pH. Any suitable base may be added to adjust the pH, as long as the added base does not interfere with the other desirable properties of the ink composition. Some examples of suitable bases include NaOH or KOH. The amount of base added will depend, at least in part, on the initial pH of the ink composition and the desired final pH of the ink composition. In an example, the pH is adjusted from about 9 to about 10, and a suitable amount of base is added until this pH is obtained.

It has been found that lithium salt(s) of the fatty acid(s) in the examples of the ink composition of the present disclosure form the anti-evaporative layer during uncapped non-use at an interface between the air and the ink composition in an orifice of a nozzle, thereby reducing evaporation of the water from the ink composition. The anti-evaporative layer may form in about 2 seconds or less of uncapped non-use. This anti-evaporative layer contributes to improving the decap time of the inks disclosed herein.

Figure 2:
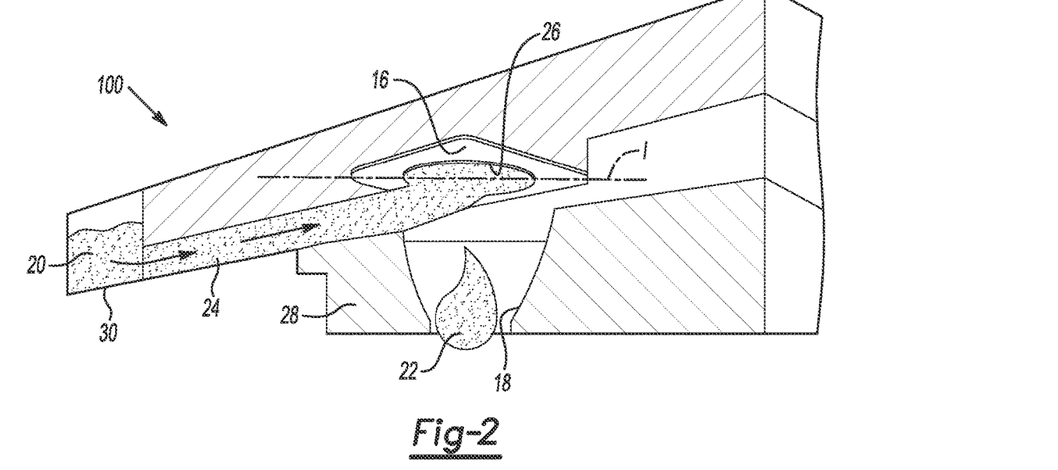
FIG. 2 is an enlarged, cutaway, cross-sectional, perspective semi-schematic illustration of an example print cartridge.

Referring now to FIG. 2, a print cartridge is generally depicted at 100. The print cartridge 100 includes a housing 28 (which may include one or more layers of different materials) that is operatively connected to a reservoir 30 that contains an example of the ink composition 20 disclosed herein. A fluid path/ink channel 24 connects the reservoir 30 to a fluid ejector 16. In a thermal inkjet print cartridge, the fluid ejector 16 is a heating element that creates heat to vaporize the ink composition 20, which creates a bubble that expands to push the ink composition 20 (in the form of drops 22) out of an orifice 26 of a nozzle 18 that is aligned with the fluid ejector 16. While a single fluid ejector 16 and nozzle 18 is shown, it is to be understood that a single print cartridge 100 may include multiple (e.g., 400 or some other desirable number) fluid ejectors 16 and nozzles 18. While not shown, it is to be understood that the print cartridge 100 includes an integrated circuit that routes signals (e.g., from a processor that is capable of running suitable computer readable instructions) to the desirable fluid ejector(s) 16 and nozzle(s) 18 for firing ink drops 22 therefrom to produce images on a desirable medium.

The print cartridge 100 is representative of a single nozzle, and it is to be understood that a single print cartridge includes many nozzles. When included in a high speed inkjet printing system including a page wide array, it is to be understood that several print cartridges 100 (i.e., dies), each of which includes at least 1,000 nozzles, are arranged together. While not shown, it is to be understood that the high speed inkjet printing system may also include an automated service station. This service station may be programmed to ensure that the print cartridge 100 is automatically capped, decapped, and cleaned with minimal system downtime. This also contributes to enhanced print quality.

Figure 3:
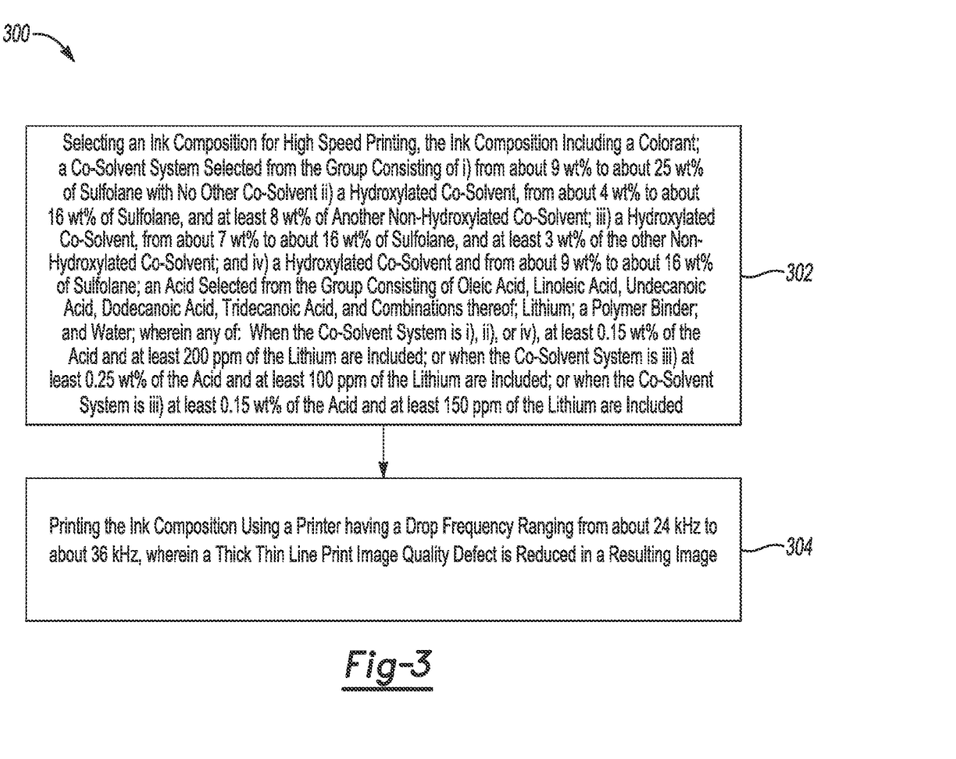
FIG. 3 is a flow diagram illustrating an example of a method according to an example of the present disclosure.

Referring now to FIG. 3, an example of a method for improving capped recovery performance of the ink composition 20 according to the present disclosure is generally depicted at 300. As shown at reference numeral 302, the method begins with selecting an ink composition for high speed inkjet printing. The ink composition includes the colorant; the co-solvent system selected from the group consisting of i) from about 9 wt % to about 25 wt % of sulfolane with no other co-solvent, ii) a hydroxylated co-solvent, from about 4 wt % to about 16 wt % of sulfolane, and at least 8 wt % of an other non-hydroxylated co-solvent; iii) a hydroxylated co-solvent, from about 7 wt % to about 16 wt % of sulfolane, and at least 3 wt % of the other non-hydroxylated co-solvent; and iv) a hydroxylated co-solvent and from about 9 wt % to about 16 wt % of sulfolane; the acid selected from the group consisting of oleic acid, linoleic acid, undecanoic acid, dodecanoic acid, tridecanoic acid, and combinations thereof; lithium; the polymer binder; and water. In the ink composition when the co-solvent system is i), ii), or iv), at least 0.15 wt % of the acid and at least 200 ppm of the lithium are included; or when the co-solvent system is iii), at least 0.25 wt % of the acid and at least 100 ppm of the lithium are included; or when the co-solvent system is iii), at least 0.15 wt % of the acid and at least 150 ppm of the lithium are included. The method 300 further includes printing the ink composition 20 using a printer having a drop frequency ranging from about 24 kHz to about 36 kHz, as shown at reference numeral 304. In the resulting image, a thick thin line print image quality defect is reduced.

To further illustrate the present disclosure, examples are given herein. It is to be understood that these examples are provided for illustrative purposes and are not to be construed as limiting the scope of the present disclosure.

EXAMPLES

Example 1

Seven inks (2 comparative inks and 5 example inks) were prepared according to the formulations provided in Table 3. The colorant was a self-dispersing carbon black dispersion, and the polyurethane copolymer binder was formed from the reaction of isophorone diisocyanate (IPDI) with 1,3-propanediol, 1,2-propanediol, and dimethylol propionic acid (DMPA).

Figure 4A:
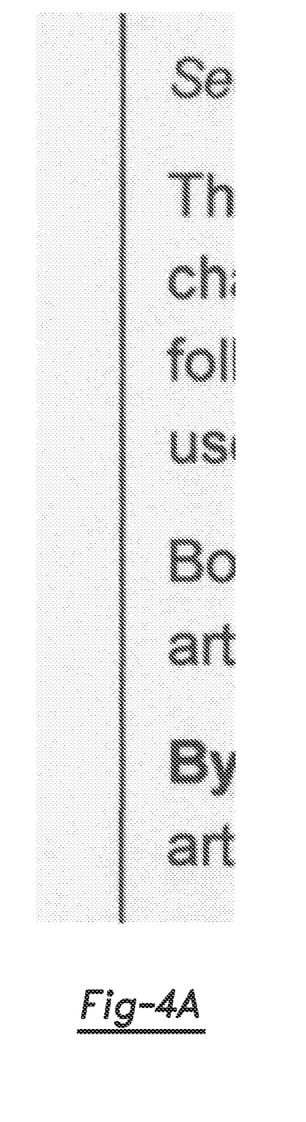
FIG. 4A is a printed image representing a ranking of 1 for thick thin line print image quality defect severity.
Figure 4B:
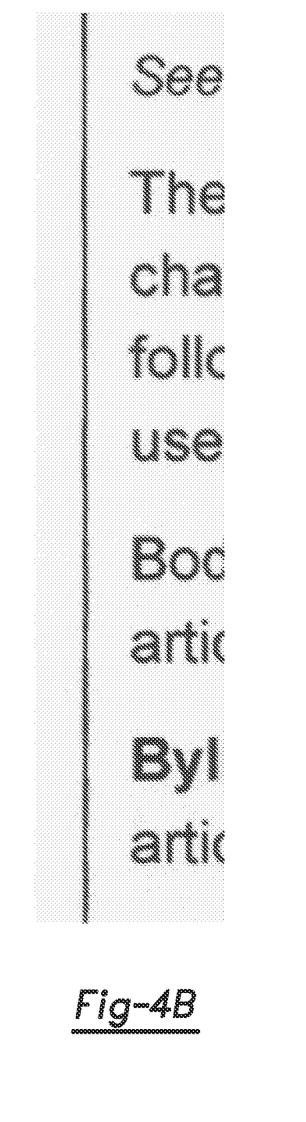
FIG. 4B is a printed image representing a ranking of 2 for thick thin line print image quality defect severity.
Figure 4C:
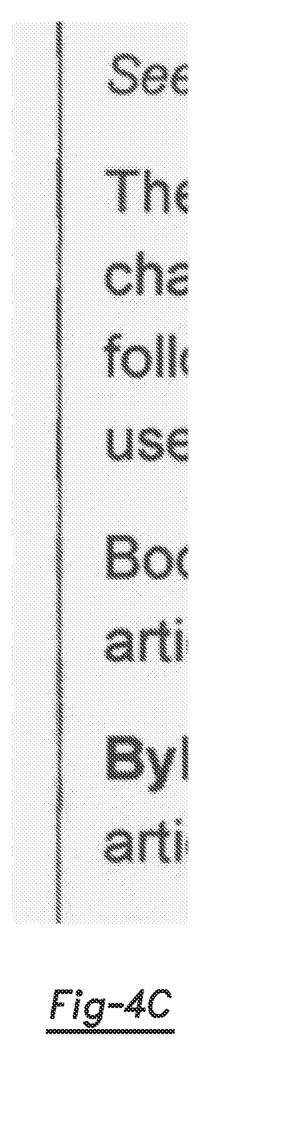
FIG. 4C is a printed image representing a ranking of 3 for thick thin line print image quality defect severity.

Each of the inks was filled into an HP 950/951 ink supply cartridge and was printed on HP Multipurpose Paper using a modified HP OfficeJet Pro 8600 printer (having a drop frequency up to 36 kHz). The resulting images were visually inspected for thick thin line print image quality defects. The images were ranked according to its thick thin line print image quality defect severity. An image with a ranking of 3 had severe thick thin line print image quality defects; an image with a ranking of 2 had some thick thin line print image quality defects, but less than those images with a ranking of 3; and an image with a ranking of 1 had no noticeable thick thin line print image quality defects. FIG. 4A represents a printed image having a ranking of 1, FIG. 4B represents a printed image having a ranking of 2, and FIG. 4C represents a printed image having a ranking of 3. The thick thin line print image quality defect severity rankings for the images printed with comparative inks 1 and 2 and inks 3-7 are also provided in Table 3.

TABLE 3

| Ink component | Comp. Ink 1 | Comp. Ink 2 | Ink 3 | Ink 4 | Ink 5 | Ink 6 | Ink 7 |
|---|---|---|---|---|---|---|---|
| Carbon black dispersion wt % | 4.4 | 4.4 | 4.4 | 4.4 | 4.4 | 4.4 | 4.4 |
| Polyurethane copolymer binder | 1.7 | 1.7 | 1.7 | 1.7 | 1.7 | 1.7 | 1.7 |
| 2-hydroxyethyl-2-pyrrolidinone* wt % | 13.2 | 13.2 | 13.2 | 13.2 | 13.2 | 12.0 | 12.0 |
| Sulfolane wt % | 1.7 | 4.0 | 7.0 | 10.5 | 4.0 | 9.7 | 9.7 |
| 2-pyrrolidinone wt % | 8.8 | 6.5 | 3.5 | none | 8.8 | none | none |
| Total Co-Solvent wt % | 23.7 | 23.7 | 23.7 | 23.7 | 26.0 | 21.7 | 21.7 |
| Lithium ppm | 212 | 212 | 212 | 212 | 212 | 212 | 212 |
| Dodecanoic Acid wt % | 0.18 | 0.18 | 0.18 | 0.18 | 0.18 | 0.24 | 0.20 |
| Oleic Acid wt % | 0.02 | 0.02 | 0.02 | 0.02 | 0.02 | 0.02 | none |
| SURFYNOL ® 104 wt % | 0.05 | 0.05 | 0.05 | 0.05 | 0.05 | 0.05 | 0.05 |
| SURFADONE ® LP-100 wt % | 0.05 | 0.05 | 0.05 | 0.05 | 0.05 | 0.05 | 0.05 |
| ACTICIDE ® B20 wt % | 0.2 | 0.2 | 0.2 | 0.2 | 0.2 | 0.2 | 0.2 |
| ACTICIDE ® M20 wt % | 0.07 | 0.07 | 0.07 | 0.07 | 0.07 | 0.07 | 0.07 |
| water | balance | balance | balance | balance | balance | balance | balance |
| Image TTL Severity Ranking | 3 | 3 | 1 | 1 | 2 | 1 | 1 |

In comparative ink 1, the sulfolane amount was relatively low (1.7 wt %) while the other non-hydroxylated co-solvent (i.e., 2-pyrrolidinone) was relatively high (8.8 wt %). In comparative ink 2 and example inks 3 and 4, the sulfolane amount was increased and the 2-pyrrolidinone amount was decreased (i.e., sulfolane replaced the 2-pyrrolidinone in comparative ink 2 and example inks 3 and 4). As such, the total co-solvent amount in each of these inks was 23.7 wt %. In example inks 6 and 7, the sulfolane replaced the 2-pyrrolidinone completely and also replaced some of the hydroxylated. In these inks, the total co-solvent amount in each of these inks was slightly reduced to 21.7 wt %. When comparing all of the image TTL severity rankings in Table 3, it is clear that increasing the amount of sulfolane to 7 wt % or more without increasing the total amount of co-solvents (examples 3 and 4) or even slightly reducing the total amount of co-solvents (examples 6 and 7) helps to mitigate the TTL print image quality defects.

However, when the sulfolane amount was increased to 4 wt % (comparative ink 2 and example ink 5), the mitigating effect on the TTL print image quality defects was seen only when the total non-hydroxylated solvent amount (i.e., sulfolane and 2-pyrrolidinone) was maintained at the relatively high amount. As such, when the sulfolane amount is as low as 4 wt %, the examples disclosed herein also include the higher amount of the other non-hydroxylated solvent (i.e., sulfolane is added in addition to, rather than replacing, the other non-hydroxylated solvent).

Example 2

The effect of lithium on the thick thin line print image quality defects was also tested. Example ink 5 from Example 1 was used. Comparative ink 8 had the same formulation as example ink 5, except that no lithium was included. The formulations are provided in Table 4.

Each of the inks was printed as described in Example 1, and the resulting images were visually inspected for thick thin line print image quality defects using the severity ranking scale of Example 1. The thick thin line print image quality defect severity rankings are also provided in Table 4.

TABLE 4

| Ink component | Ink 5 | Comparative Ink 8 |
|---|---|---|
| Carbon black dispersion wt % | 4.4 | 4.4 |
| Polyurethane copolymer binder | 1.7 | 1.7 |
| 2-hydroxyethyl-2-pyrrolidinone* wt % | 13.2 | 13.2 |
| Sulfolane wt % | 4.0 | 4.0 |
| 2-pyrrolidinone wt % | 8.8 | 8.8 |
| Total Co-Solvent wt % | 26.0 | 26.0 |
| Lithium ppm | 212 | none |
| Dodecanoic Acid wt % | 0.18 | 0.18 |
| Oleic Acid wt % | 0.02 | 0.02 |
| SURFYNOL ® 104 wt % | 0.05 | 0.05 |

TABLE 4-continued

| Ink component | Ink 5 | Comparative Ink 8 |
|---|---|---|
| SURFADONE ® LP-100 wt % | 0.05 | 0.05 |
| ACTICIDE ® B20 wt % | 0.2 | 0.2 |
| ACTICIDE ® M20 wt % | 0.07 | 0.07 |
| water | balance | balance |
| Image TTL Severity Ranking | 2 | 3 |

When comparing the image TTL severity rankings of example ink 5 and comparative ink 8, it is clear that adding lithium helps to mitigate the TTL print image quality defects. Additional amounts of lithium (e.g., up to about 400 ppm) may further mitigate the TTL print image quality defects.

Example 3

The effect of lithium on the thick thin line print image quality defects was also tested by incorporating different amounts of lithium in the ink formulations. Example ink 3 from Example 1 was used in this Example. Comparative inks 9 and 10 had the same formulation as example ink 3, except that 50 ppm and 100 ppm of lithium was included instead of 212 ppm. Example ink 11 also has the same formulation as example ink 3, except that 150 ppm of lithium was included. The formulations are provided in Table 5.

Each of the inks was printed as described in Example 1, and the resulting images were visually inspected for thick thin line print image quality defects using the severity ranking scale of Example 1. The thick thin line print image quality defect severity rankings are also provided in Table 5.

TABLE 5

| Ink component | Ink 3 | Comparative Ink 9 | Comparative Ink 10 | Ink 11 |
|---|---|---|---|---|
| Carbon black dispersion wt % | 4.4 | 4.4 | 4.4 | 4.4 |
| Polyurethane copolymer binder | 1.7 | 1.7 | 1.7 | 1.7 |
| 2-hydroxyethyl-2-pyrrolidinone* wt % | 13.2 | 13.2 | 13.2 | 13.2 |
| Sulfolane wt % | 7.0 | 7.0 | 7.0 | 7.0 |
| 2-pyrrolidinone wt % | 3.5 | 3.5 | 3.5 | 3.5 |
| Total Co-Solvent wt % | 23.7 | 23.7 | 23.7 | 23.7 |
| Lithium ppm | 212 | 50 | 100 | 150 |
| Dodecanoic Acid wt % | 0.18 | 0.18 | 0.18 | 0.18 |
| Oleic Acid wt % | 0.02 | 0.02 | 0.02 | 0.02 |
| SURFYNOL ® 104 wt % | 0.05 | 0.05 | 0.05 | 0.05 |
| SURFADONE ® LP-100 wt % | 0.05 | 0.05 | 0.05 | 0.05 |

TABLE 5-continued

| Ink component | Ink 3 | Comparative Ink 9 | Comparative Ink 10 | Ink 11 |
|---|---|---|---|---|
| ACTICIDE ® B20 wt % | 0.2 | 0.2 | 0.2 | 0.2 |
| ACTICIDE ® M20 wt % | 0.07 | 0.07 | 0.07 | 0.07 |
| water | balance | balance | balance | balance |
| Image TTL Severity Ranking | 1 | 3 | 3 | 2 |

When comparing the image TTL severity rankings of example inks 3 and 11 with comparative inks 9 and 10, it is clear that adding lithium in an amount of at least 150 ppm helps to mitigate the TTL print image quality defects.

Example 4

The effect of the acid (dodecanoic acid in these examples) on the thick thin line print image quality defects was also tested. Comparative ink 10 from Example 3 was used. Example inks 12 and 13 had same formulation as comparative ink 10, except that the dodecanoic amount was increased. The formulations are provided in Table 6.

Each of the inks was printed as described in Example 1, and the resulting images were visually inspected for thick thin line print image quality defects using the severity ranking scale of Example 1. The thick thin line print image quality defect severity rankings are also provided in Table 6.

TABLE 6

| Ink component | Comparative Ink 10 | Ink 12 | Ink 13 |
|---|---|---|---|
| Carbon black dispersion wt % | 4.4 | 4.4 | 4.4 |
| Polyurethane copolymer binder | 1.7 | 1.7 | 1.7 |
| 2-hydroxyethyl-2-pyrrolidinone* wt % | 13.2 | 13.2 | 13.2 |
| Sulfolane wt % | 7.0 | 7.0 | 7.0 |
| 2-pyrrolidinone wt % | 3.5 | 3.5 | 3.5 |
| Total Co-Solvent wt % | 23.7 | 23.7 | 23.7 |
| Lithium ppm | 100 | 100 | 100 |
| Dodecanoic Acid wt % | 0.18 | 0.26 | 0.34 |
| Oleic Acid wt % | 0.02 | 0.02 | 0.02 |
| SURFYNOL ® 104 wt % | 0.05 | 0.05 | 0.05 |
| SURFADONE ® LP-100 wt % | 0.05 | 0.05 | 0.05 |
| ACTICIDE ® B20 wt % | 0.2 | 0.2 | 0.2 |
| water | balance | balance | balance |
| Image TTL Severity Ranking | 3 | 1 | 1 |

When comparing the image TTL severity rankings of example inks 12 and 13 with comparative ink 10, it is clear that adding increasing amounts of dodecanoic acid when the lithium level is as low as 100 ppm helps to mitigate the TTL print image quality defects.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range of from about 9 wt % to about 25 wt % should be interpreted to include not only the explicitly recited limits of from about 9 wt % to about 25 wt %, but also to include individual values, such as 10 wt %, 14.5 wt %, 15 wt %, etc., and sub-ranges, such as from about 11 wt % to about 22.5 wt %, from about 12 wt % to about 16 wt %, etc. Furthermore, when "about" or "substantially" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An ink composition, comprising:
   a colorant;
   a co-solvent system selected from the group consisting of
      i) from about 9 wt % to about 25 wt % of sulfolane with no other co-solvent, ii) a hydroxylated co-solvent, from about 4 wt % to about 16 wt % of sulfolane, and at least 8 wt % of an other non-hydroxylated co-solvent; iii) a hydroxylated co-solvent, from about 7 wt % to about 16 wt % of sulfolane, and at least 3 wt % of the other non-hydroxylated co-solvent; and iv) a hydroxylated co-solvent and from about 9 wt % to about 16 wt % of sulfolane;
   an acid selected from the group consisting of oleic acid, linoleic acid, undecanoic acid, dodecanoic acid, tridecanoic acid, and combinations thereof;
   lithium;
   a polyurethane copolymer binder formed from the polymerization of a diisocyanate and at least three diols including a first diol containing a hydrophilic stabilizing group, and a second diol having less than 8 atoms in a backbone chain between two hydroxyl groups, wherein a mole percentage of the second diol is at least 30% of a total mole percentage of diol monomers in the polyurethane copolymer binder, and wherein an acid number of the polyurethane copolymer ranges from 50 to 70; and
   water;
   wherein any of:
      when the co-solvent system is i) or ii) or iv), at least 0.15 wt % of the acid and at least 200 ppm of the lithium are included;
      when the co-solvent system is iii), at least 0.25 wt % of the acid and at least 100 ppm of the lithium are included; or
      when the co-solvent system is iii), at least 0.15 wt % of the acid and at least 150 ppm of the lithium are included.

2. The ink composition as defined in claim 1 wherein a viscosity of the ink composition ranges from about 1.5 mPa·s to about 5.0 mPa·s.

3. The ink composition as defined in claim 1 wherein the co-solvent system is i) and consists of the sulfolane alone.

4. The ink composition as defined in claim 1 wherein the co-solvent system is ii), or iii), or iv), and wherein the hydroxylated co-solvent is selected from the group consisting of 2-methyl-1,3-propanediol, 2-hydroxyethyl-2-pyrrolidinone, 2-ethyl-2-hydroxymethyl-1,3-propanediol, di-(2-hydroxyethyl)-5,5-dimethylhydantoin, glycerol, diethylene glycol, triethylene glycol, tripropylene glycol, tetraethylene glycol, dipropyleneglycol, 3-methyl-1,3-butanediol, 3-methyl-1,5-pentanediol, 1-(2-hydroxyethyl)-2-imidazolidinone, 1,6-hexanediol, 1,5-pentanediol, and combinations thereof.

5. The ink composition as defined in claim 1 wherein when the co-solvent system is ii) or iii), the other non-hydroxylated co-solvent is selected from the group consisting of 2-pyrrolidinone, diethyleneglycol dimethyl ether, and combinations thereof.

6. The ink composition as defined in claim 1, further comprising an additive chosen from a biocide, a non-ionic surfactant, and combinations thereof.

7. The ink composition as defined in claim 1, including:
from about 2.0 wt % to about 6.5 wt % of the colorant; and
from about 1.0 wt % to about 3.0 wt % of the polyurethane copolymer binder.

8. A print cartridge, comprising:
a fluid reservoir;
a fluid ejector in fluid communication with the fluid reservoir;
a nozzle in fluid communication with the fluid ejector;
the ink composition of claim 1 present in the fluid reservoir; and
an anti-evaporative layer present at an interface between air and the ink composition in an orifice of the nozzle, the anti-evaporative layer formed during uncapped non-use, thereby reducing evaporation of the water from the ink composition.

9. The print cartridge as defined in claim 8 wherein:
the co-solvent system is ii) or iii) or iv);
the hydroxylated co-solvent is selected from the group consisting of 2-methyl-1,3-propanediol, 2-hydroxyethyl-2-pyrrolidinone, 2-ethyl-2-hydroxymethyl-1,3-propanediol, di-(2-hydroxyethyl)-5,5-dimethylhydantoin, glycerol, diethylene glycol, triethylene glycol, tripropylene glycol, tetraethylene glycol, dipropyleneglycol, 3-methyl-1,3-butanediol, 3-methyl-1,5-pentanediol, 1-(2-hydroxyethyl)-2-imidazolidinone, 1,6-hexanediol, 1,5-pentanediol, and combinations thereof; and
when the non-hydroxylated co-solvent is ii) or iii), the other non-hydroxylated co-solvent is selected from the group consisting of 2-pyrrolidinone, diethyleneglycol dimethyl ether, and combinations thereof.

10. A high speed printing method, comprising:
selecting the ink composition of claim 1; and
printing the ink composition using a printer having a drop frequency ranging from about 24 kHz to about 36 kHz;
wherein a thick thin line print image quality defect is reduced in a resulting image.

11. The ink composition as defined in claim 1 wherein the co-solvent system is ii), or iii), or iv), and wherein the hydroxylated co-solvent is 2-hydroxyethyl-2-pyrrolidinone.

12. The ink composition as defined in claim 1 wherein the co-solvent system is ii) or iii), and wherein the other non-hydroxylated co-solvent is 2-pyrrolidinone.

13. An ink composition, comprising:
a colorant;
a co-solvent system including:
2-hydroxyethyl-2-pyrrolidinone as a hydroxylated co-solvent; and
from about 9.7 wt % to about 10.5 wt % of sulfolane alone as a non-hydroxylated co-solvent;
an acid selected from the group consisting of oleic acid, linoleic acid, undecanoic acid, dodecanoic acid, tridecanoic acid, and combinations thereof;
lithium;
a polymer binder; and
water;
wherein at least 0.15 wt % of the acid and at least 200 ppm of the lithium are included.

14. An ink composition, comprising:
a colorant;
a co-solvent system including:
2-hydroxyethyl-2-pyrrolidinone as a hydroxylated co-solvent;
about 4.0 wt % of sulfolane; and
about 8.8 wt % of 2-pyrrolidinone as an other non-hydroxylated co-solvent;
lithium present in an amount of about 212 ppm;
an acid present in an amount of about 0.18 wt %, the acid selected from the group consisting of oleic acid, linoleic acid, undecanoic acid, dodecanoic acid, tridecanoic acid, and combinations thereof;
a polymer binder; and
water.

15. An ink composition, comprising:
a colorant;
a co-solvent system including:
2-hydroxyethyl-2-pyrrolidinone as a hydroxylated co-solvent; and
about 7.0 wt % of sulfolane and about 3.5 wt % of 2-pyrrolidinone as an other non-hydroxylated co-solvent;
an acid selected from the group consisting of oleic acid, linoleic acid, undecanoic acid, dodecanoic acid, tridecanoic acid, and combinations thereof;
lithium;
a polymer binder; and
water;
wherein:
the lithium is present in an amount of at least 150 ppm; and
the acid is present in an amount of about 0.18 wt %.

16. An ink composition, comprising:
a colorant;
a co-solvent system including:
2-hydroxyethyl-2-pyrrolidinone as a hydroxylated co-solvent; and
about 7.0 wt % of sulfolane and about 3.5 wt % of 2-pyrrolidinone as an other non-hydroxylated co-solvent;
an acid selected from the group consisting of oleic acid, linoleic acid, undecanoic acid, dodecanoic acid, tridecanoic acid, and combinations thereof;

lithium;
a polymer binder; and
water;
wherein:
   the lithium is present in an amount of about 100 ppm; and
   the acid is present in an amount of at least 0.25 wt %.

* * * * *

UNITED STATES PATENT AND TRADEMARK OFFICE
CERTIFICATE OF CORRECTION

PATENT NO. : 10,273,375 B2
APPLICATION NO. : 15/311170
DATED : April 30, 2019
INVENTOR(S) : Vladimir Jakubek et al.

It is certified that error appears in the above-identified patent and that said Letters Patent is hereby corrected as shown below:

On the Title Page

In Column 2, item (57), Abstract, Line 3, after "polymer" delete "as".

Signed and Sealed this
Twenty-seventh Day of August, 2019

Andrei Iancu
*Director of the United States Patent and Trademark Office*